(12) United States Patent
Favaretto

(10) Patent No.: US 11,124,067 B2
(45) Date of Patent: Sep. 21, 2021

(54) METHOD AND DEVICE FOR CONTROLLING A CAR, IN PARTICULAR A SPORT CAR

(71) Applicant: FERRARI S.p.A., Modena (IT)

(72) Inventor: Fabrizio Favaretto, Formigine (IT)

(73) Assignee: FERRARI S.p.A., Modena (IT)

( * ) Notice: Subject to any disclaimer, the term of this patent is extended or adjusted under 35 U.S.C. 154(b) by 167 days.

(21) Appl. No.: 16/395,507

(22) Filed: Apr. 26, 2019

(65) Prior Publication Data

US 2019/0329651 A1  Oct. 31, 2019

(30) Foreign Application Priority Data

Apr. 27, 2018  (IT) .......................... 102018000004929

(51) Int. Cl.
*B60K 26/02* (2006.01)
*B60T 7/10* (2006.01)
*B62D 1/12* (2006.01)

(52) U.S. Cl.
CPC .............. *B60K 26/02* (2013.01); *B60T 7/102* (2013.01); *B62D 1/12* (2013.01); *B60K 2026/029* (2013.01)

(58) Field of Classification Search
CPC .............. B60K 26/02; B60K 2026/029; B60K 2026/027; B60T 7/102; B62D 1/12; B60Y 2400/83; B60W 2050/0066; B60W 2520/10
USPC ........................................ 180/333, 402, 404
See application file for complete search history.

(56) References Cited

U.S. PATENT DOCUMENTS

| | | | |
|---|---|---|---|
| 2002/0074181 A1* | 6/2002 | Brandt | G05G 25/02 180/315 |
| 2003/0141133 A1* | 7/2003 | Yanaka | G05G 5/03 180/315 |
| 2006/0113141 A1* | 6/2006 | Ackermann | B60N 2/797 180/326 |
| 2006/0137931 A1* | 6/2006 | Berg | B62D 1/22 180/333 |
| 2008/0277190 A1* | 11/2008 | McCord | E02F 9/2004 180/444 |

(Continued)

FOREIGN PATENT DOCUMENTS

| | | |
|---|---|---|
| DE | 19625497 C1 | 10/1997 |
| EP | 1504981 A | 2/2005 |
| GB | 883554 A | 11/1961 |

OTHER PUBLICATIONS

International Search Report issued in International Application No. 201800004929, completed Dec. 17, 2018; 7 pages.

*Primary Examiner* — Toan C To
(74) *Attorney, Agent, or Firm* — Cantor Colburn LLP

(57) ABSTRACT

Method for controlling a car, in particular a sports car, provided with a relative power train, relative braking devices and relative steering means, the method being based on a joystick comprising a lever, arranged in the car to identify a forward tilt and a backward tilt parallel to a longitudinal development of the car for interacting with said power train and with said braking devices, and two side tilts to the left and to the right for interacting with said steering means so as to determine a trajectory of the car, wherein the method, according to a first operating condition, comprises a first step of respectively associating said forward tilt and said backward tilt with a proportional forward and backward acceleration of the car.

10 Claims, 3 Drawing Sheets

(56) References Cited

U.S. PATENT DOCUMENTS

| | | | |
|---|---|---|---|
| 2009/0198414 A1* | 8/2009 | Mohning | B62D 1/12 701/41 |
| 2011/0088961 A1* | 4/2011 | Case | E02F 9/2004 180/333 |
| 2013/0306395 A1* | 11/2013 | Frazier | G05G 5/03 180/333 |
| 2014/0158452 A1 | 6/2014 | Bowman et al. | |
| 2014/0305715 A1* | 10/2014 | Makino | B60K 17/356 180/6.24 |
| 2015/0367846 A1* | 12/2015 | Sans | B62D 15/027 701/23 |
| 2018/0336007 A1* | 11/2018 | Li | G06F 3/167 |
| 2019/0375392 A1* | 12/2019 | Rake | F16H 59/08 |
| 2020/0317050 A1* | 10/2020 | Erickson | B60K 26/02 |

* cited by examiner

METHOD AND DEVICE FOR CONTROLLING A CAR, IN PARTICULAR A SPORT CAR

CROSS-REFERENCE TO RELATED APPLICATIONS

This patent application claims priority from Italian patent application no. 102018000004929 filed on Apr. 27, 2018, the entire disclosure of which is incorporated herein by reference.

The present invention relates to the field of car control methods and devices.

STATE OF THE ART

Cars are generally governed by a steering wheel. For purely aesthetic reasons, in the past, steering wheels have been designed in the shape of an aircraft cloche, without however allowing the steering wheel to tilt forwards and backwards, since it is obviously not possible to control the pitching of a car.

The steering wheel was necessary to reduce the effort on the driver's arms. Over time, first hydraulic and then electric steering control servomechanisms have been introduced. Therefore, it has become possible to reduce the size of the steering wheel.

In the industrial field, the use of joysticks for controlling forklift trucks is known. However, they have very different dynamics from those of a vehicle, especially of a sports vehicle, and therefore the relative control system is designed for handling the trucks in small spaces at very low speed.

SUMMARY OF THE INVENTION

The object of the present invention is to provide a vehicle control method and device that is simpler and more intuitive than known methods.

The basic idea of the present invention is to implement a joystick that allows controlling both the displacement/stop and the trajectory followed by the vehicle. In particular, according to the present invention, the forward or backward tilt angle of the joystick lever imparts a corresponding forward or backward acceleration to the vehicle. Evidently, if the vehicle advances, a forward acceleration is deemed positive since it determines an increase in the forward speed. Vice versa, if the vehicle advances, a backward acceleration is deemed negative since it determines a decrease in the forward speed.

Specular conditions are obtainable when the vehicle retreats.

Therefore, when the lever is released, the vehicle proceeds at a constant speed, as long as the driver does not intervene on the joystick lever to increase or decrease the speed.

Obviously, the joystick interacts with both the vehicle's power train and its brakes.

According to a preferred variant of the invention, when the vehicle is equipped with devices for regenerative braking, then the brakes are activated based on the negative acceleration imparted by the joystick lever.

Preferably, slight decelerations can be obtained simply by reducing the torque delivered by the power train. Greater decelerations are obtained by regenerative braking, and significant decelerations and/or low speeds are obtained by combining regenerative braking with the use of the brakes.

The aforementioned three operating conditions can be determined based on the backward tilt angle imparted to the joystick lever.

According to a preferred variant of the invention, which can be combined with any of the preceding variants, the control mode can be varied according to the speed of the vehicle.

For example, above a first predetermined forward speed threshold of the vehicle, the forward tilt angle of the joystick imparts an acceleration, whereas below said first predetermined speed threshold the tilt angle of the joystick (directly) imparts a vehicle forward speed. Therefore, above said first predetermined threshold, the vehicle speed is indirectly controlled through the acceleration of the vehicle, and below said first predetermined forward speed threshold the forward speed is directly controlled and therefore the release of the joystick lever causes the vehicle to stop. When the vehicle is stalled, moving the lever backwards, the vehicle moves backwards.

According to another preferred variant of the invention, which can be combined with the preceding one, switching between acceleration control and speed control is implemented by means of another control element, for example a bistable button, or by axially pushing the joystick lever, which therefore defines a monostable push-button switching between an operating control mode and the other each time it is pushed.

With regard to the steering angle control, it is implemented by means of the same joystick by moving it laterally, namely perpendicularly to the control direction of the vehicle's displacement/braking.

With regard to the steering angle control, according to a preferred variant of the invention, a side tilt angle of the joystick lever identifies an intervention speed of the steering system actuator. Therefore, releasing the joystick lever leaves the steering angle unchanged. Preferably, the proportionality factor between the tilt angle of the joystick lever and the variation speed of the steering angle is reduced proportionally to the vehicle speed to make the steering control operation "parametric".

According to another preferred variant of the invention, the side tilt angle of the joystick lever corresponds directly to the steering angle rather than to the intervention speed of the actuator that controls the steering angle. Therefore, the release of the joystick lever causes the wheels to realign.

According to a further preferred variant of the invention, the two steering angle control modes can be alternatively actuated based on a second bistable or monostable push-button or based on a second speed threshold switching between an angle control and a variation speed control of the steering angle, and vice versa.

Thanks to the present invention, the vehicle is particularly convenient to drive on extra urban roads and highways, thus limiting the active intervention of the driver as much as possible.

The claims describe preferred variants of the invention, forming an integral part of the present description.

BRIEF DESCRIPTION OF THE FIGURES

Further aims and advantages of the present invention will become clear from the following detailed description of an embodiment of the same (and its variants) and from the annexed drawings given purely as an explanatory and non-limiting example, in which.

The same numbers and the same reference letters in the figures identify the same elements or components.

Figure 1:
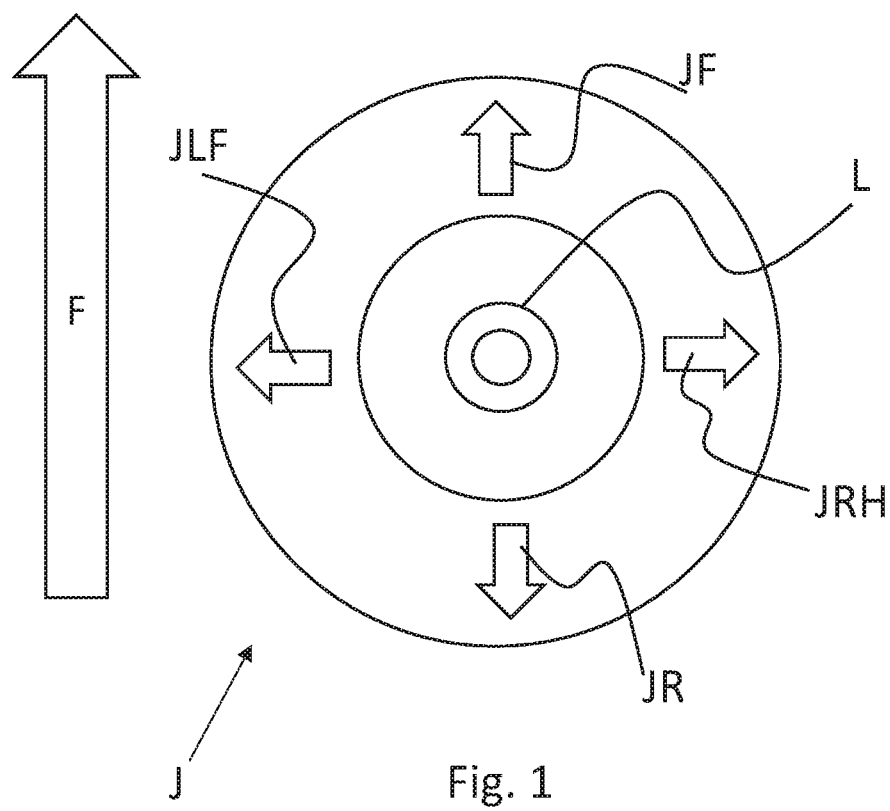
FIG. 1 shows a schematic top view of a joystick.
Figure 2:
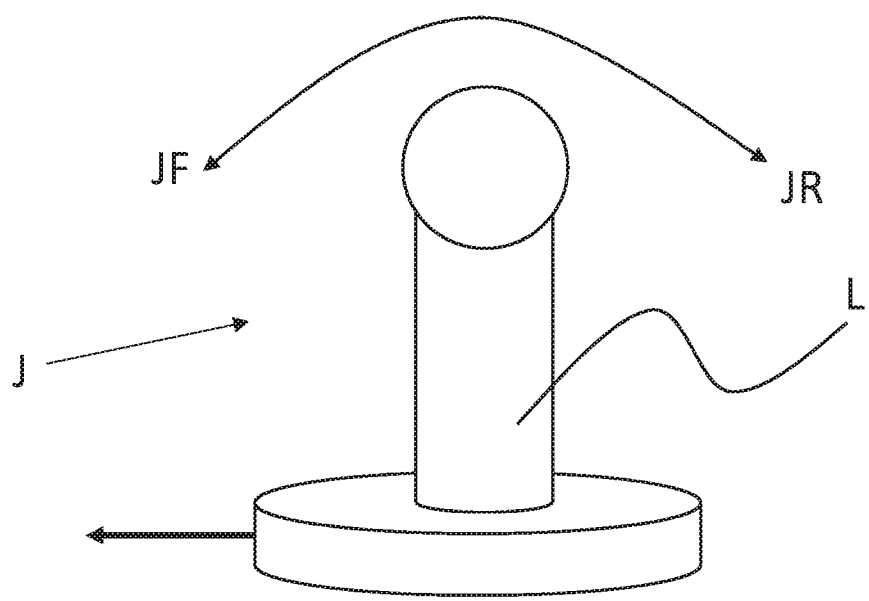
FIG. 2 shows a side view (on the left) of the joystick of FIG. 1, showing the joystick lever in the rest position and lever forward and backward tilts.

In the present description, the term "second" component does not necessarily imply the presence of a "first" component. These terms are in fact used as labels only to differentiate components and should not be meant in a limiting way, unless otherwise specified in the description.

DETAILED DESCRIPTION OF EMBODIMENTS

With reference to the figure, it shows a joystick J with a relative lever L.

Next to the joystick, a forward arrow F identifies a longitudinal development of the direct vehicle according to a relative forward movement.

Four arrows are associated with the joystick, namely:
a first JF, parallel and concordant with the aforementioned forward arrow F,
a second JR, parallel and opposite to the aforementioned forward arrow F,
a third JRH and a fourth JLF, perpendicular to the aforementioned forward arrow F and indicating respectively the right and the left side of the vehicle.

According to the present invention, the forward and backward movements of the joystick lever respectively allow controlling the forward movement and the braking of the vehicle.

In particular, a forward or backward angular deviation of the lever L of the joystick corresponds to an acceleration. This is positive when the lever is moved forward and negative when the lever is moved backward if the vehicle is moving forward and vice versa if the vehicle is moving backward.

Therefore, when the lever is released, the vehicle proceeds at a constant speed.

For example, if the joystick lever is moved forwards by 10° (JF), this corresponds to 10 m/s^2 of acceleration and to a first speed that obviously depends on said tilt and on the time T over which the joystick lever has been moved forwards.

When the lever L is moved backwards, the vehicle is brought to a second speed, lower than the first speed, which can be zero if the driver wishes to stop the vehicle.

Therefore, when the lever is released, the vehicle proceeds at a constant speed, as long as the driver does not intervene on the joystick lever to increase or decrease the speed or to reverse the motion.

Obviously, the joystick interacts with both the vehicle's power train and its brakes.

According to a preferred variant of the invention, when the vehicle is equipped with devices for regenerative braking, for example, the on-board electrical generator or a BRM (Boost recuperation machine), then the brakes are activated based on the intensity of the negative acceleration given by the joystick.

Preferably,
slight decelerations can be obtained by reducing the torque delivered by the power train,
greater decelerations are obtained by regenerative braking if the vehicle is equipped with means for regenerative braking, whereas the heat engine does not deliver any driving torque, and
significant decelerations and/or low speeds are obtained by combining regenerative braking with the use of brakes.

The aforementioned three operating conditions can be associated with respective three contiguous angular portions comprised between the maximum backward tilt angle and the rest position of the joystick lever.

A similar acceleration distribution criterion can be applied even in the positive forward accelerations, when the vehicle is hybrid, by distributing the required torque between the heat engine and the electric power generator based on the forward tilt angle of the lever L.

According to the present description, power train means any propulsion device that can comprise:
an internal combustion engine
an electric engine
a hydrodynamic engine
and their combinations.

According to a preferred variant of the invention, which can be combined with any of the preceding variants, the control mode can be varied according to the vehicle forward speed. For example, above a first predetermined forward speed threshold, e.g. 30 km/h, the forward tilt angle of the joystick imparts an acceleration (positive), whereas below said first predetermined speed threshold, the forward tilt angle of the joystick imparts a forward speed so that by releasing the joystick lever the vehicle stops. Therefore, the backward or braking acceleration (negative) depends on the speed with which the joystick lever comes back to the rest position.

On the contrary, above the aforementioned first forward speed threshold, the more intense the negative acceleration, i.e. the braking, the greater the backward tilt angle JR of the joystick lever.

If the joystick is designed to control only accelerations, when the vehicle is stalled, a backward tilt of the joystick lever imparts a backward acceleration of the vehicle exactly as described above with regard to the forward speed.

If the joystick is configured to directly control the vehicle speed below said first speed threshold, when the vehicle is stalled a backward tilt of the joystick lever imparts a backward speed and the backward acceleration is proportional to the speed with which the lever is brought back.

The vehicle control can be differentiated depending on its forward or backward movement.

Figure 3:
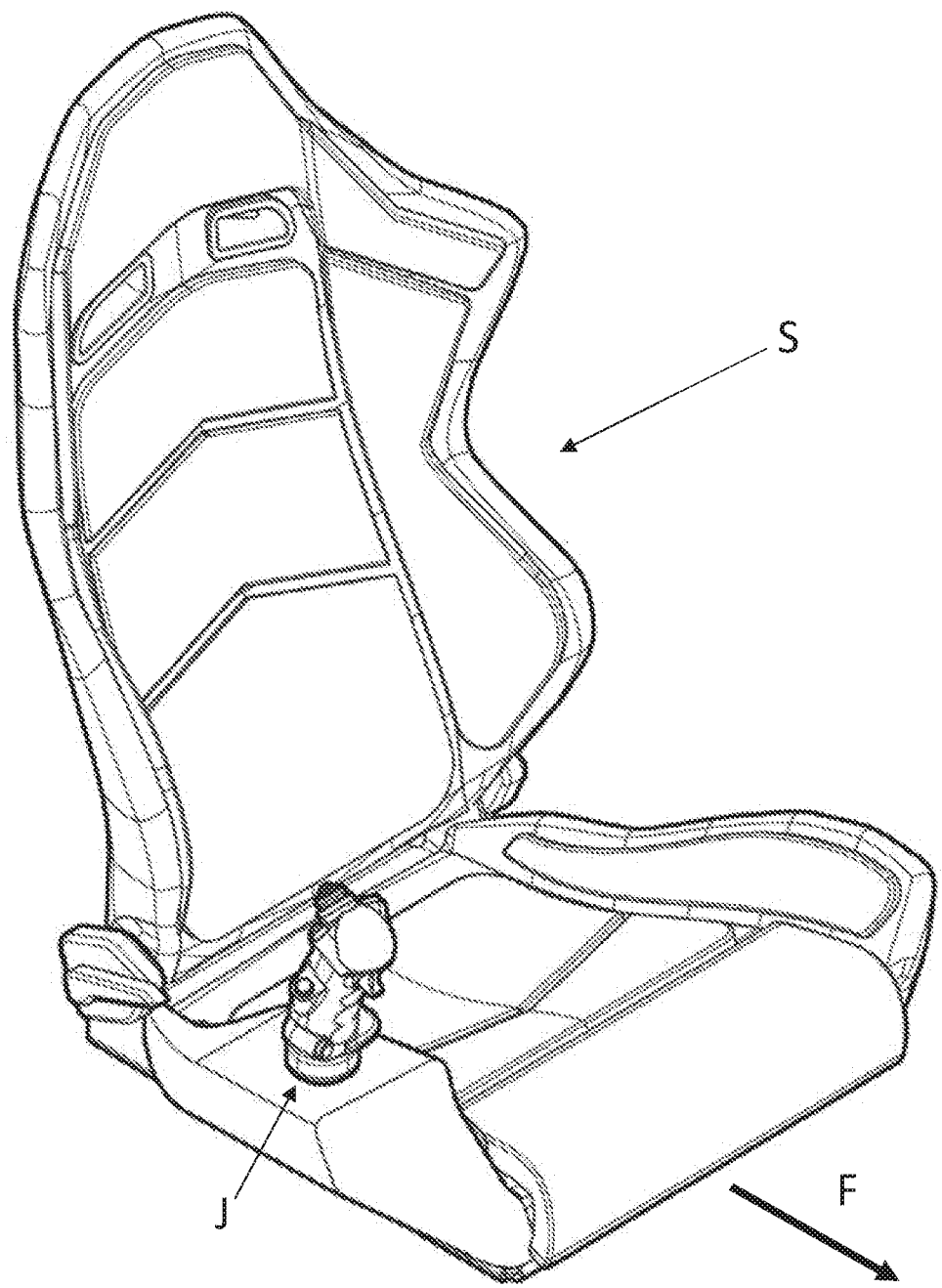
FIG. 3 shows a perspective view of a car seat provided with the present control system, at least partially operated by the joystick of FIG. 1.
Figure 4:
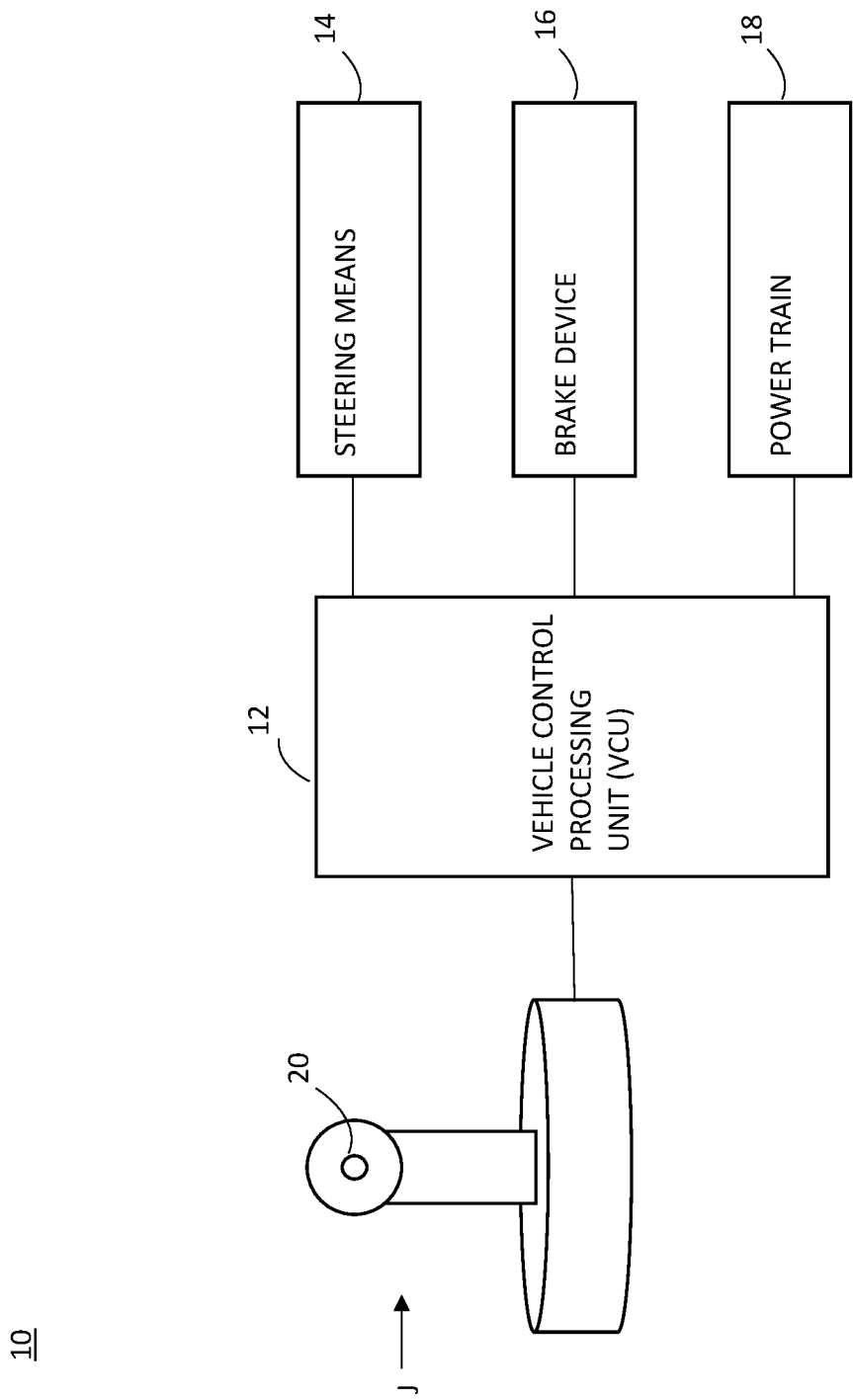
FIG. 4 shows a schematic view of a car management device including the joystick and lever of FIG. 1 for controlling the car.

According to another preferred variant of the invention, the switching between the acceleration control and the speed control is operated by another control element, e.g. a bistable push-button 20 as is generally shown in FIG. 4, or by a sensor associated with an axial pressure of the same joystick lever that therefore defines a monostable push-button switching between one mode and another at each pressure. The particular location of the bistable push button 20 shown in FIG. 4 is exemplary and not intended to be limiting. Moreover, there can be more than one push button as is generally shown in preceding FIG. 3.

When planning to switch between an acceleration control and a speed control and vice versa, the control system applies a filtering on the electric signal generated by the joystick in order to allow a more fluid or more energetic response of the power train.

As described above, the joystick lever can also be moved to the right and to the left by controlling the trajectory of the vehicle.

According to a preferred variant of the invention, the side tilt angle of the joystick lever corresponds directly to the steering angle. Furthermore, the proportionality factor, i.e. the function relating the angle of the joystick lever to the steering angle is also an inverse function of the vehicle speed.

Considering that the joystick generates electrical, analog and/or digital signals, said proportionality factor corresponds with an amplification gain of the control signal of the corresponding steering actuators.

According to another preferred variant of the invention, a side tilt angle of the joystick lever identifies an intervention speed of the steering system actuator. Therefore, releasing the joystick lever leaves the steering angle unchanged. Preferably, the proportionality factor between the tilt angle of the joystick lever and the variation speed of the steering angle is reduced proportionally to the vehicle speed to make the steering control operation "parametric".

According to a further preferred variant of the invention, the two steering angle control modes can be alternatively actuated based on a second bistable or monostable pushbutton or based on a second speed threshold. In particular, by exceeding said predetermined speed threshold, the system switches between an angle control and a variation speed control of the steering angle, and vice versa by falling below said second speed threshold.

Thanks to the present invention, the vehicle is particularly convenient to drive on extra urban roads and highways, thus limiting the active intervention of the driver as much as possible.

The present invention can advantageously be implemented in a car, especially a high-performance car. It can be equipped with ADAS driver assistance systems and the control of the vehicle by means of the joystick is supervised by the driving assistance system.

Driver assistance systems, also referred to as "advanced driver assistance systems", or ADAS, are systems to assist the driver during the driving procedure. They are designed to increase car safety and more generally, road safety.

A driver assistance system consists of a hardware comprising radars and/or optical sensors and interfaces for numerous vehicle input signals, such as signals from the driver pedals/levers and from on-board cameras. In some cases, the driver assistance system also has an interface with the cartographic navigation system of the vehicle.

The driver assistance system hardware, e.g., car management device 10 (see, for example, FIG. 4), which includes the joystick (J) and lever (L) as generally shown in FIG. 1, is programmed to collect and process the signals received from these numerous sensors/numerous interfaces in order to integrate or replace the driver's control elements to increase the vehicle safety.

The present invention including the car management device 10 can be advantageously implemented by means of a computer program that comprises coding means for carrying out one or more steps of the method, when this program is run on a vehicle control processing unit (VCU) 12, i.e., a processing unit, as shown in FIG. 4. That is, the VCU 12 can be used to control the steering means 14, brake device 16, and power train 18 as is generally shown in FIG. 4 and described above. Therefore, it is clear that the scope of protection extends to said computer program and further to computer readable means comprising a recorded message, said computer readable means comprising program-coding means for carrying out one or more steps of the method when said program is run on said engine control processing unit.

Variants of the described non-limiting example are possible without thereby departing from the scope of protection of the present invention, comprising all equivalent embodiments for a person skilled in the art.

From the description given above, the person skilled in the art is able to carry out the object of the invention without introducing further construction details. The elements and characteristics shown in the various preferred embodiments, including the drawings, can be combined with one another without, however, departing from the scope of protection of the present application. What is described in the part relating to the state of the art only requires a better understanding of the invention and does not represent a declaration of existence of what has been described. Furthermore, if not specifically excluded in the detailed description, what is described in the part relating to the state of the art is to be considered as an integral part of the detailed description.

The invention claimed is:

1. A method for controlling a car including a power train, braking devices, and steering means, the method comprising:
    configuring a joystick including a lever in the car to provide;
        a forward tilt (JF) and a backward tilt (JR) parallel to a longitudinal development (F) of the car for interacting with said power train and with said braking devices, and
        two side tilts (JLF, JRH) to the left and to the right for interacting with said steering means so as to determine a trajectory of the car,
    wherein according to a first operating condition, said forward tilt and said backward tilt are associated with a proportional forward and backward acceleration, respectively, of the car, and wherein, when said lever (L) is in a rest position, said power train and said breaking braking means are controlled so that said car is stalled.

2. The method according to claim 1, wherein, when said lever (L) is in a rest position, said power train and said braking means are controlled so that said car proceeds at a constant speed.

3. The method according to claim 1, wherein, according to a second operating condition, said forward and backward tilt are associated with a forward speed and a backward speed, respectively.

4. The method according to claim 1, wherein said first operating condition is implemented when a speed of said car exceeds a first predetermined speed threshold and said second operating condition is implemented when said speed of said car is below said first predetermined speed threshold.

5. The method according to claim 1, wherein a switching between said first operating condition and said second operating condition is carried out by means of a push-button or by detecting an axial pressure on said lever (L).

6. The method according to claim 1, wherein, according to a third operating condition, the right and left side tilts of said lever are associated with a corresponding steering angle, either to the right or to the left, respectively.

7. The method according to claim 1, wherein, according to a fourth operating condition, the right and left side tilts of said lever are associated with a speed with which said steering means actuate a corresponding steering, either to the right or to the left, respectively.

8. The method according to claim 7, wherein a third operating condition is defined when the speed of said car is below a second predetermined speed threshold and said fourth operating condition is defined when the speed of said car exceeds said second predetermined speed threshold.

9. The method according to claim 7, wherein a switching between said third operating condition and said fourth operating condition is carried out by means of a second push-button or by detecting an axial pressure on said lever (L).

10. A car comprising:
   a car management comprising the joystick and a processing unit (VCU) configured to process signals generated by said joystick to consequently control said power train, said braking devices and said steering means, wherein said processing unit (VCU) is configured to carry out all the steps according to claim 1.

\* \* \* \* \*